United States Patent
Bingham et al.

(10) Patent No.: US 7,685,460 B1
(45) Date of Patent: Mar. 23, 2010

(54) MULTIPLE CONCURRENT RESTORE USING SAME USER INTERFACE

(75) Inventors: Scott Forrest Bingham, Sammamish, WA (US); Upanshu Singhal, Redmond, WA (US); Matthew D. Buchman, Seattle, WA (US); Patrick M. Simonich, Kent, WA (US)

(73) Assignee: EMC Corporation, Hopkinton, MA (US)

( * ) Notice: Subject to any disclaimer, the term of this patent is extended or adjusted under 35 U.S.C. 154(b) by 392 days.

(21) Appl. No.: 11/536,164

(22) Filed: Sep. 28, 2006

(51) Int. Cl.
*G06T 11/00* (2006.01)
(52) U.S. Cl. ...................................................... 714/6
(58) Field of Classification Search ............... 714/2
See application file for complete search history.

(56) References Cited

U.S. PATENT DOCUMENTS

| | | | | |
|---|---|---|---|---|
| 6,148,412 A * | 11/2000 | Cannon et al. | ............... | 714/6 |
| 6,269,431 B1 * | 7/2001 | Dunham | ............... | 711/162 |
| 6,505,216 B1 * | 1/2003 | Schutzman et al. | ......... | 707/204 |
| 6,851,073 B1 * | 2/2005 | Cabrera et al. | ............... | 714/15 |
| 6,922,763 B2 * | 7/2005 | Suzuki et al. | ............... | 711/162 |
| 7,043,504 B1 * | 5/2006 | Moore et al. | ............... | 707/202 |
| 7,146,387 B1 * | 12/2006 | Russo et al. | ............... | 707/204 |
| 7,346,623 B2 * | 3/2008 | Prahlad et al. | ............... | 707/102 |
| 7,418,619 B1 * | 8/2008 | Uhlmann et al. | ............... | 714/2 |
| 7,549,079 B2 * | 6/2009 | Connolly et al. | ............... | 714/5 |
| 2004/0093360 A1 * | 5/2004 | Hudson | ............... | 707/204 |
| 2005/0165863 A1 * | 7/2005 | Mukker | ............... | 707/202 |
| 2006/0130071 A1 * | 6/2006 | Martin et al. | ............... | 719/319 |
| 2006/0190505 A1 * | 8/2006 | DeMaio et al. | ............... | 707/204 |
| 2007/0006018 A1 * | 1/2007 | Thompson et al. | ............... | 714/6 |
| 2008/0005198 A1 * | 1/2008 | Cobb | ............... | 707/204 |

* cited by examiner

*Primary Examiner*—Nadeem Iqbal
(74) *Attorney, Agent, or Firm*—Workman Nydegger

(57) ABSTRACT

A method and system for performing multiple concurrent recovery operations using a single instance of a user interface. One exemplary method includes initiating a first recovery operation via a single user interface. The first recovery operation includes copying a first data object from a first backup storage location to a first recovery storage location. The exemplary method further includes initiating a second recovery operation via the single user interface without requiring a user to open a separate instance of the user interface. Similarly, the second recovery operation includes copying a second data object from a second backup storage location to a second recovery storage location. At least a portion of the second recovery operation occurs concurrently with at least a portion of the first recovery operation.

20 Claims, 4 Drawing Sheets

MULTIPLE CONCURRENT RESTORE USING SAME USER INTERFACE

BACKGROUND

1. The Field of the Invention

The present invention relates to data backup and restore operations. More specifically, the present invention relates to methods and systems for managing multiple restore operations from a single user interface.

2. The Relevant Technology

In this society where many personal and business interactions are data driven, data can become easily lost or corrupted due to events such as system failures, viruses, power outages, etc. Backing up data has become an important feature of computer networks because of the increasing dependence upon computers and networks to perform vital business and personal functions. The ability to easily, accurately, and reliably recover data that have been lost is expected by users of computers and/or networks.

Backup and recovery of data are typically accomplished through the use of software that backs up the data and that recovers the data from the backup copy. As the amount of data continues to increase, backing up and recovering the data become more complex. In particular, where multiple client computers and storage locations must be restored by an administrator, the process of restoring each individual client and storage location can become tedious where the backup and recovery system requires the administrator to launch a separate interface for each restore operation.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

To further clarify the features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Figure 1:
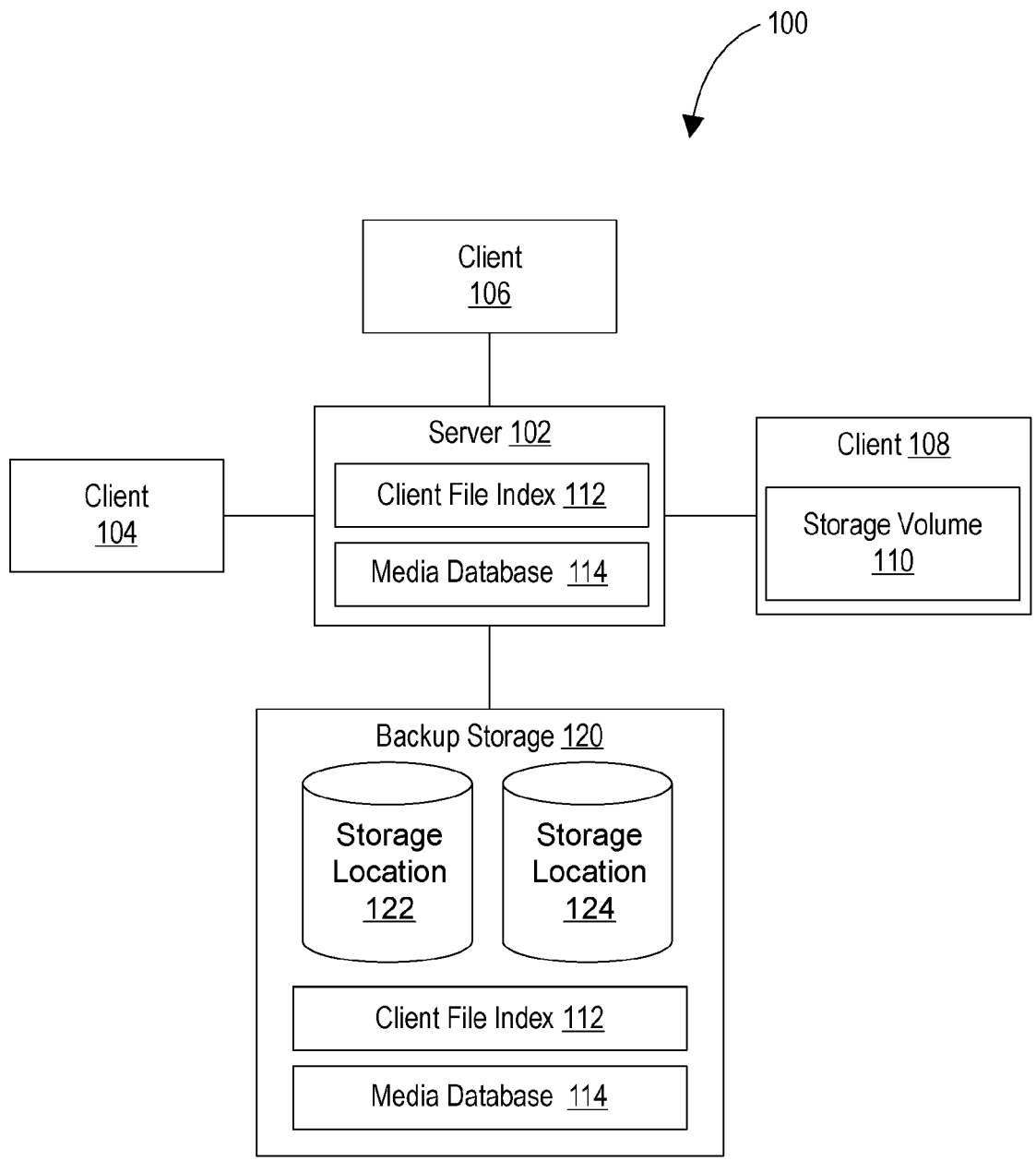
FIG. 1 illustrates an exemplary environment for implementing embodiments of the present invention.

In the following detailed description of various embodiments of the invention, reference is made to the accompanying drawings which form a part hereof, and in which are shown by way of illustration specific embodiments in which the invention may be practiced. It is to be understood that other embodiments may be utilized and structural changes may be made without departing from the scope of the present invention Embodiments of the present invention provide for methods and systems for performing recovery operations. An exemplary system includes a management interface having a graphical user interface which allows a user to initiate multiple concurrent recovery operations without being required to open separate instances of the graphical user interface for each recovery operation. The management interface communicates with a recovery server which performs the recovery of data from one or more backup storage devices and saves backup copies of the data objects to one or more devices that are being restored. The recovery server may include a background process, such as a daemon program, for handling multiple recovery operations concurrently.

As used herein, the terms "data" and "data object" may include, but are not limited to, directories (e.g., volumes, file systems, and the like), user data, system data, applications, services, operating systems, instructions, and the like, that can be stored on one or more storage devices of a computer. Backing up or recovering the data may include backing up or recovering any of the data herein defined or understood by those of skill in the art. Data may be organized in logical directories that do not necessarily correspond to a particular storage device. The term "directory" can be used interchangeably with the term "volume" or "file system" to refer to any means of logically organizing data on a computer.

For purposes of describing the present invention, the term "production application" will be used to describe the source of data that is being backed up. However, the technology disclosed herein facilitates the backup and recovery of all types of data and/or data structures, and can be beneficial to applications whose data are continually changing. Thus, although certain embodiments described herein will often refer to the backup of production applications, the technology described herein applies equally to the backup and recovery of any type of data, including files, databases, directories, volumes, file systems, servers, user data, system data, services, operating systems, computer executable instructions, computer settings, disks, and the like.

Certain embodiments described herein will involve electronic communication between a client computer system (hereinafter referred to as a "client") requesting access to a network service at a server computer system (hereinafter referred to as a "server"). Accordingly, the client sends a request to the server for access to its system resources, wherein if the client is authorized and validated, the server responds with a response message providing the desired information. Of course, other messaging patterns between client and server are available, as are well known in the art.

As used herein, the term "user" may refer to a person operating the server (e.g., administrator). Alternatively, the term "user" may refer to a person at a client or management console. Users are able to initiate a request for mirroring, backup and/or restore, although it will be appreciated that the server may have additional functionalities not available to the client or management console.

1. Overview of Exemplary Environment for Backing Up and Restoring Data

FIG. 1 illustrates an exemplary system 100 for performing backup and recovery operations that can be adapted for use with the invention. FIG. 1 illustrates a server 102 that is in communication with one or more clients 104, 106 and 108. Each client 104, 106 and 108 represents a system having data that can be backed-up and restored by the server 102. Each client 104, 106 and 108 can be relatively simple (e.g., a desktop computer) or relatively complex (e.g., a large database server or one of a cluster of servers), and may further include storage devices and storage networks, including direct attached storage (DAS), network attached storage (NAS), a storage area network (SAN), continuous data protection (CDP) and other storage environments. The client 108, for example, may include one or more storage volumes 110 which may include one or more drives, as well as applications and services.

In the example of FIG. 1, the server 102 has access to backup storage 120. Backup storage 120 may include one or more storage locations 122 and 124 for storing one or more copies of data objects that have been backed up from the clients 104, 106 and 108. The backup storage 120 can be located in the server 102 or may be distinct and separate from the server 102. For example, the server 102 may perform scheduled backups of the data residing in client 104, 106 and 108, wherein selected data objects from the clients are copied to the storage locations 122 and 124. In one embodiment, data is backed up from the clients 104, 106 and 108 using backup groupings.

A client file index 112 and a media database 114 may be stored both on the server 102 and on the backup storage 120. The client file index 112 is an index of the backed up data items residing in storage 120. The media database 114 is an index of the backup volumes. The client file index 112 and the media database 114 are collectively referred to herein as the "online indexes". The online indexes may be stored on the backup storage 120 and on the server 102 after the backup operation is complete. However, it will be appreciated that other operating systems may use similar data structures for maintaining the directories and items that are backed up in order to be able to restore the directories and items during recovery.

During a data recovery operation, the server 102 reads data objects pertaining to a selected backup grouping from the backup storage 120 and copies the data objects to the appropriate client 104, 106 and/or 108. The online indexes 116 and 118 may be employed for mapping the backup groupings to the appropriate data objects stored on the backup storage 120. For example, selected backup groupings representing one or more data objects may be copied from the backup storage 120 to a storage device on the client 104 in order to return the data on the storage device to a previous state. Likewise, a backup grouping may represent the operating system state of the client 106 in order to return the operating system of the client to a previous state (e.g., when the client has lost an operating system drive due to an unforeseen disaster). The recovery operation saves the user of the client 106 from rebuilding the system, reconfiguring services, and reinstalling and reconfiguring applications on the client.

2. Exemplary System for Performing Multiple Concurrent Restore Operations

Figure 2:
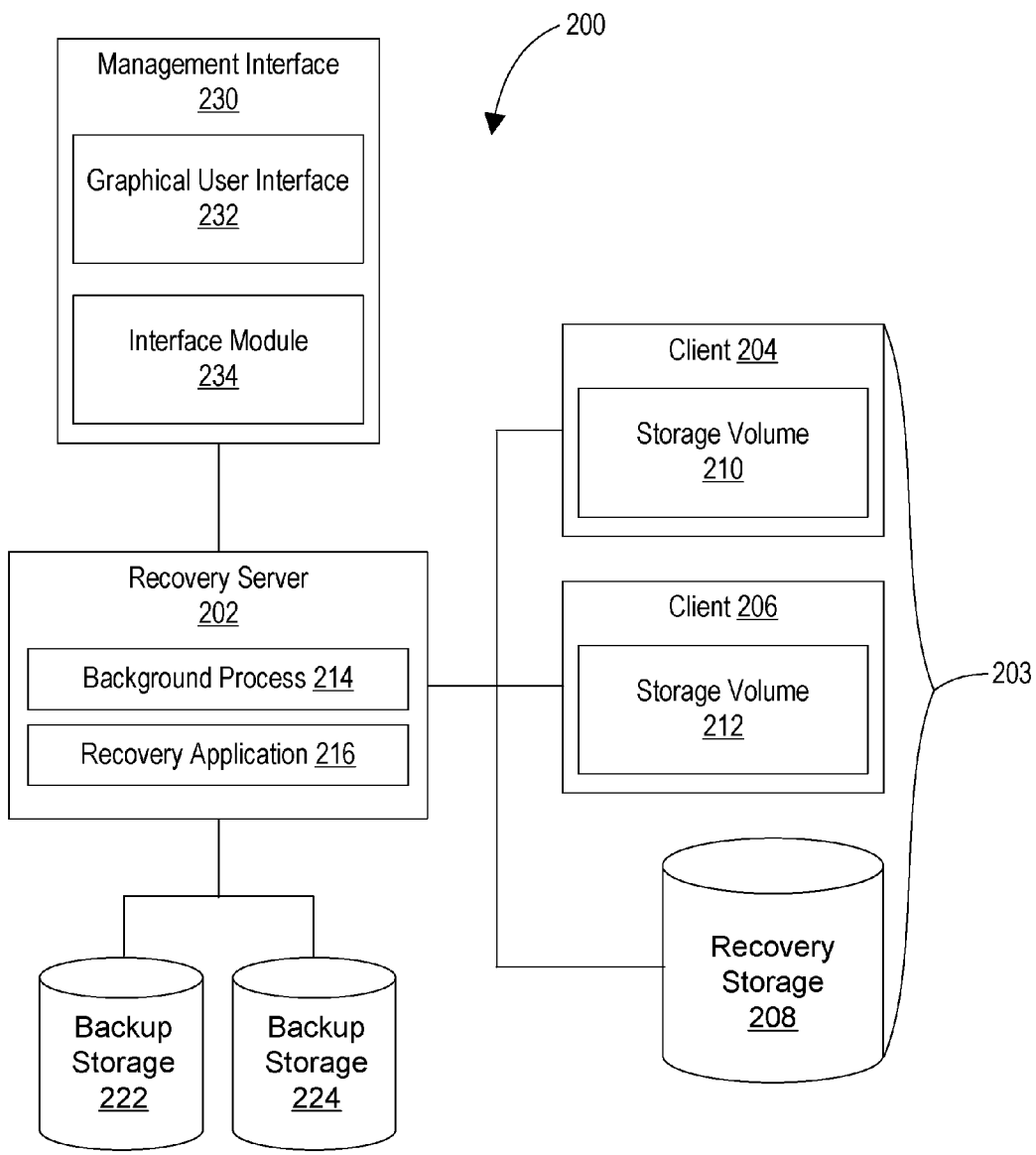
FIG. 2 illustrates an exemplary system for performing multiple concurrent recovery operations.

Referring now to FIG. 2, a more detailed example is illustrated using a diagrammed reference to a system of 200 for performing recovery operations. FIG. 2 illustrates a management interface 230 that is in communication with a recovery server 202. Although the recovery server 202 can be used to recover data, in some embodiments of the invention, the recovery server 202 may also be expanded to perform additional data protection operations, such as data backup, data mirroring, continuous data protection, snapshot management, as well as other data protection operations. In one embodiment, the management interface 230 is located on the recovery server 202 such that a user or administrator may manage recovery operations directly from the recovery server 202. The recovery server 202 also has a relationship with one or more data recovery locations, collectively referred to as 203, which will be restored during a recovery operation, represented by clients 204 and 206, and recovery storage 208. As described in FIG. 1, the clients 204 and 206 may include one or more storage volumes 210 and 212, respectively, which may include one or more drives, as well as applications and services.

Each data recovery location 203 represents a system with data to be restored. As described in reference to the clients 104, 106 and 108 of FIG. 1, each data recovery location 203 can be relatively simple (e.g., a desktop computer) or relatively complex (e.g., a large database server or one of a cluster of servers). A recovery location 203 may further be a node on a network or a storage device on a storage area network (SAN), and may include a storage device located at an off-site location for protecting against local disasters, such as flood, fire, theft, and the like. Each recovery location 203 may also operate under a different operating system or platform than the server 202. In the context of a restore operation, a recovery location 203 may operate under the control of the server 202.

When a recovery operation is performed, the data objects being recovered are read from one or more of the backup storage locations 222 and 224. The backup storage locations 222 and 224 can be located in the server 202 or may be distinct and separate from the server 202. The backup storage locations 222 and 224 may include various types of storage devices commonly used for data backup purposes, including but not limited to magnetic storage, semiconductor storage, optical disk storage, CDP storage, Network Attached Storage, Direct Attached Storage, and the like and combinations thereof.

The management interface 230, as employed in the present invention, enables the user to initiate and manage multiple concurrent recovery operations from a single graphical user interface 232. In general, management interface 230 allows a user to initiate a first recovery operation using the graphical user interface 232. The first recovery operation copies a data object from one of the backup storage locations 222 or 224 to one of the data recovery locations 203. If the data objects being copied from the backup storage 222 or 224 to the data recovery location 203 are significantly large, the first recovery operation may take several minutes or even hours to complete. Therefore, while the first recovery operation is being performed, the management interface 230 of the present invention allows a user to concurrently initiate a second data recovery operation. As used herein, the term "concurrent" contemplates that at least a portion of the second recovery operation takes place while the first recovery operation is still occurring. The second recovery operation also copies a data object from one of the backup storage locations 222 or 224 to one of the data recovery locations 203.

The management interface 230 allows the second data recovery operation to be initiated without being required to open a separate instance of the graphical user interface 232. In other words, the same instance of the graphical user interface 232 used to initiate the first data recovery operation may also be employed by the user to initiate the second data recovery operation. The present invention saves the user from either being required to wait for the first recovery operation to complete prior to initiating the second recovery operation or from being required to open a separate graphical user interface 232 for each recovery operation being performed.

The system 200 is not limited to the performance of two concurrent recovery operations. Instead, any number of additional recovery operations may be initiated by the user via a single instance of the graphical user interface 232.

The recovery server 202 may include a recovery application 216 that performs various recovery functions. The recovery application 216 may provide a variety of services to facilitate the copying of data objects from the backup storage locations 222 and/or 224 to one of the data recovery locations 203. For example, recovery application 216 may be configured to manage mirroring operations of the data residing in backup storage 222 and 224. The recovery module 216 may also perform automated concurrent recovery operations in accordance with a predefined schedule. Furthermore, the recovery module 216 may also facilitate the recovery of data from storage locations having unique capabilities, such as CDP storage. For example, if the backup storage location 222 uses CDP technology, the recovery module 216 and its peripherals may be configured to handle the identification of a version of the data object to be recovered as it existed at an identified point in time in the past.

As described previously, in addition to recovery functions, the recovery application 216 may perform various other replication functions. For example, recovery application 216 can be responsible for managing the protection of clients 204 and 206 and recovery storage 208, including the performance of scheduled backup operations of the clients 204, 206 and the recovery storage 208. Recovery application 216 may further be configured to deliver data protection and management for direct attached storage (DAS), network attached storage (NAS), storage area network (SAN), CDP and other storage environments.

Although recovery application 216 may consist of backup and recovery software features from any number of manufacturers, recovery application 216 may include various features, including, but not limited to, advanced indexing, high-speed parallelism, automated media management, LAN-free backup, cluster awareness, and dynamic tape-drive sharing. Further, recovery application 216 can also coordinate creation of pseudosnapshots to perform other functions besides mirroring, backup, and recovery, such as, but not limited to, data mining, data consistency analysis, and the like.

The recovery server 202 may further include a background process 214 that is able to manage multiple concurrent recovery operations. Each time a user initiates a recovery operation via the graphical user interface 232, an interface module 234 located on the management interface 230 may communicate a request to the background process 214. The background process 214 is customized to interact with the recovery application 216 for extending the recovery application's capabilities so that it can recover more than one data object from the backup storage devices 222 and 224 in a concurrent manner. For example, the background process 214 may provide instructions to the recovery application 216 and may manage the distribution of data to the appropriate data recovery location 203, among other tasks.

In one embodiment, the background process 214 may include a daemon program, such as a job daemon. The daemon program is a program that may run continuously in the background lying dormant until one or more conditions occur. Upon the occurrence of the condition(s), the daemon program performs a designated task without disrupting the operation of the program that called the daemon. The daemon program allows the interface module 234 and the recovery application 216 to continue with their normal operations while the daemon program manages the concurrent recovery of multiple data objects.

The interface module 234 of the management interface 230 communicates recovery requests submitted by a user to the background process 214. The data communicated from the interface module 234 to the background process 214 may include an identifier for the data object(s) to be recovered from the backup storage locations 222 and 224, and the target destination where the recovered data object is to be copied (i.e., one or more of the data recovery locations 203). The data communicated from the interface module 234 to the background process 214 may also include data that are specific to the backup storage location 222 or 224 from which the data are recovered or the recovery storage location 203 to which the data are copied. As described previously, if one of the backup storage locations 222 or 224 is a CDP engine, the data communicated from the interface module 234 to the background process 214 may also include an identifier specifying a version of the data object to be recovered. Likewise, if the backup storage location 222 or 224 is a volume including one or more snapshots, the data communicated from the interface module 234 to the background process 214 may also include an identifier for specifying a specific snapshot to be recovered. Other data may also be communicated from the interface module 234 to the background process 214 to instruct the background process 214 and the recovery server 202 as to the data objects being recovered and the location to which the data objects will be copied.

The interface module 234 may further be used for gathering status information from the background process 214 regarding the success or failure of the recovery operations being performed by the recovery server 202. The status information of the recovery operations may be displayed on the graphical user interface 232. In addition to receiving an indication from the background process 214 as to whether the recovery operations were successful, the interface module 234 may further gather additional information, such as an indicator as to the progress of the recovery operations, such as the percentage of each recovery operation that has been completed. The status information gathered by interface module 234 may further be displayed on graphical user interface 232.

The system 200 may be configured to perform a variety of recovery operations in a concurrent manner. For example, where multiple data recovery operations are being performed concurrently, the data objects being copied from the backup storage devices 222 and/or 224 may or may not be identical for each recovery operation. Furthermore, the data objects being copied during the concurrent data recovery operations may be stored on separate backup storage locations, e.g., the data object being recovered for a first recovery operation may be stored on backup storage location 222 and the data objects being recovered for a second recovery operation may be stored on backup storage location 224. Alternatively, the data objects being recovered during multiple concurrent recovery operations may be stored on the same backup storage location, e.g., both data objects being recovered may reside on the backup storage location 222. Furthermore, a single data object may be recovered to multiple locations during concurrent recovery operations. For example, a user may select a single data object stored in backup storage location 224 that consists of an operating system, and may choose to restore clients 204 and 206 concurrently by copying the operating system from this backup storage location 224 to the storage volumes 210 and 212 of clients 204 and 206, respectively.

Similarly, the recovery storage location 203 to which a copy of a data object is being made during multiple concurrent recovery operations may or may not be identical. For example, a user may select to restore two or more data objects from backup storage 222 to the recovery storage 208. Alternatively, a user may elect to concurrently restore one or more data objects to both the recovery storage 208 and to one or more of the clients 204 and 206.

Figure 3:
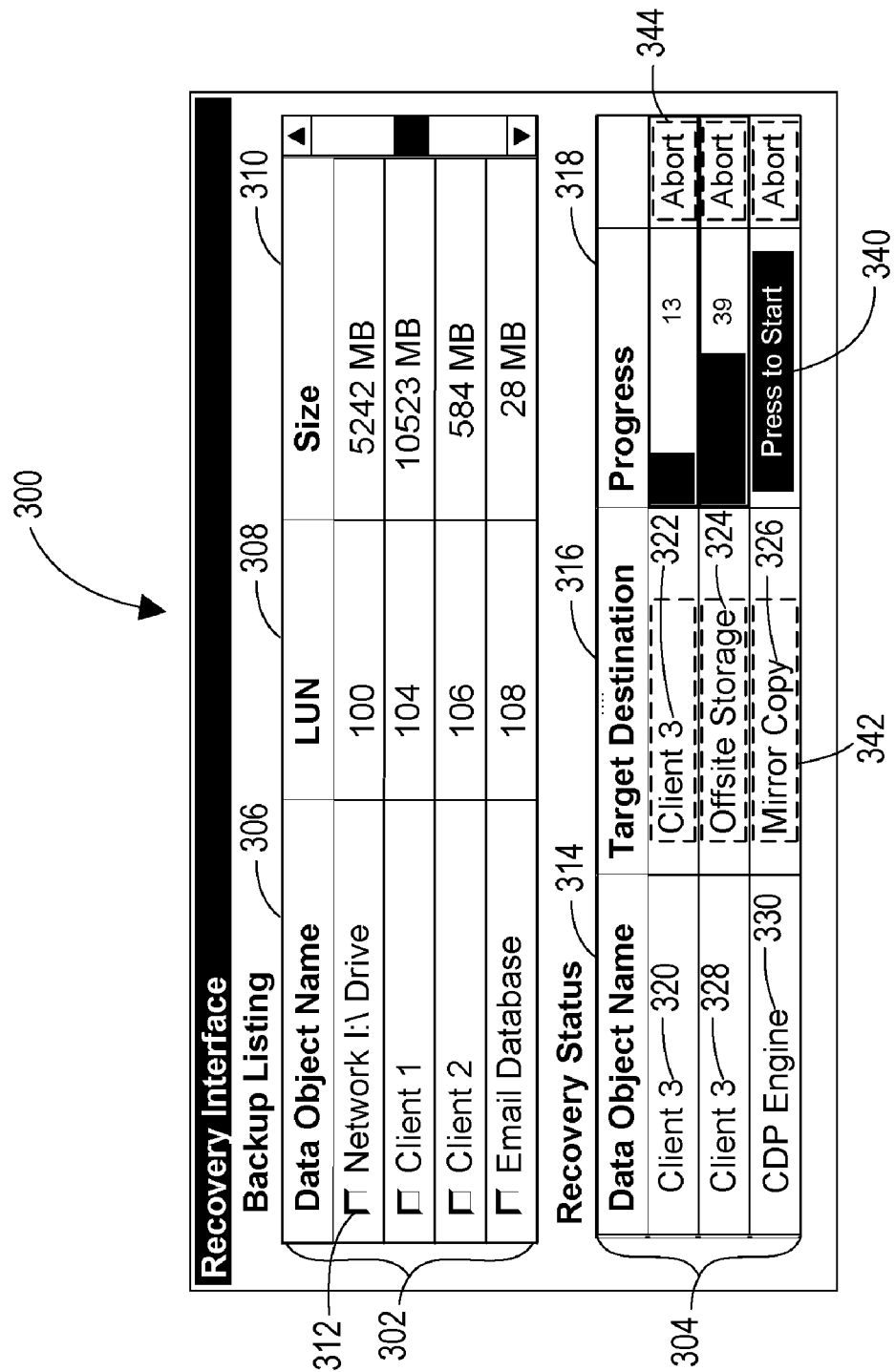
FIG. 3 illustrates an exemplary interface for initiating multiple concurrent recovery operations.

Referring now to FIG. 3, an exemplary interface 300 is provided which allows a user to initiate two or more concurrent recovery operations from a single instance of the interface 300. The interface 300 is provided by way of example, and it will be appreciated that various alterations can be made to the interface while maintaining the concept of allowing the user to initiate two or more concurrent recovery operations using the same instance of the interface 300.

The FIG. 3 example includes a backup listing area 302 for displaying a list of all possible data objects that can be recovered by the user. The backup listing area 302 contains information relevant to allowing a user to select data objects to be recovered. For example, the backup listing area 302 provides a list of data objects 306 which may be recovered. Additional information may be provided regarding each of the data objects, such as the logical unit number (LUN) 308 of each data object for identifying the location of the data object, the size 310 of each object, and the like. As described previously, additional information may be provided that is customized to the storage location wherein the backed-up data object resides. For example, where the data object resides in a CDP device, the backup listing 302 may include a field for allowing a user to select a version of the data object to be recovered from the CDP engine. The backup listing area 302 may include other types of information without departing from the scope of the present invention.

To initiate a recovery of one of the data objects contained in the list of data objects 306, a user may select the appropriate check box 312. Upon selecting the check box 312, the corresponding data object may appear below in the recovery status area 304. The selected data object may also remain in the backup listing area 302 so that the user may select to perform multiple data recovery operations using the same data object. In one embodiment, selecting the check box 312 automatically initiates the recovery process of the corresponding data object. In another embodiment, selecting the check box 312 merely causes the corresponding data object to appear in the recovery status area 304, at which time the user may initiate the recovery operation, for example, by selecting a start button 340.

The exemplary interface 300 further includes a recovery status area 304 for displaying the current status of each recovery operation (i.e., job). The recovery status area 304 may include information regarding each recovery operation. For example, the recovery status area 304 may include a list of data objects 314 being recovered, as well as the target destination 316 (i.e., the location to which the restored data object will be saved) for each of the data objects being recovered.

In one embodiment, by default, the target destination of the data object being recovered may be the original source of the data that was backed-up. For example, data object "Client 3" 320 may consist of an image created of a client computer called "Client 3" 322. In the FIG. 3 example, the client computer called "Client 3" 322 is being restored by copying the "Client 3" 320 image back to the original source "Client 3" 322.

In one embodiment, the user may manually select the target destination 316 for each recovery operation. For example, a selectable icon 342 may be provided for allowing a user to alter the target destination of the data object being recovered. Upon selecting the icon 342, an interface may be provided for allowing a user to browse to and manually select the target destination to which the data object will be restored. For example, as illustrated in FIG. 3, by selecting the icon 342, the user may specify that the image containing the "Client 3" 328 data object also be copied to an "Offsite Storage" location 324 in order to create an additional copy of the image.

The recovery status area 304 may further include an abort and/or delete function to stop a recovery operation. For example, selectable icons 344 may be provided for allowing a user to discontinue the recovery operation of the corresponding data objects. Additional selectable icons may be provided for deleting the data objects from the recovery status area 304, and for performing additional controls of the data recovery operations. Thus, using backup listing area 302 and target destination area 303, the user can select one or more jobs to be performed by the recovery system concurrently.

As described previously, the data objects may be copied to multiple target destinations during concurrent recovery operations (e.g., "Client 3" data objects 320 and 328 are copied to client computer "Client 3" 322 and to "Offsite Storage" 324, and the "CDP Engine" 330 data object is being mirrored by creating a copy to a location called "Mirror Copy" 326). Furthermore, multiple distinct data objects may be recovered in a concurrent manner using a single instance of the interface 300 (e.g., both recovery operations for "Client 3" and the "CDP Engine" 330 may be occurring at the same time).

In one embodiment, the recovery status area 304 of the interface 300 may further include a status report 318 of each of the recovery operations being performed. For example, the status report 318 may include the progress that has been made with each recovery operation, such as the percentage of the recovery operation that has been completed.

The exemplary interface 300 is a simplified rendition of what may actually be employed for performing recovery operations. The look and feel of the interface 300 as well as the syntax and other features may vary from the interface shown in FIG. 3. For example, the method employed to identify the data objects 306 stored in backup storage, the data objects 314 being recovered, the target destination 316 of the data objects, and the like may all vary from what is shown in FIG. 3.

Figure 4:
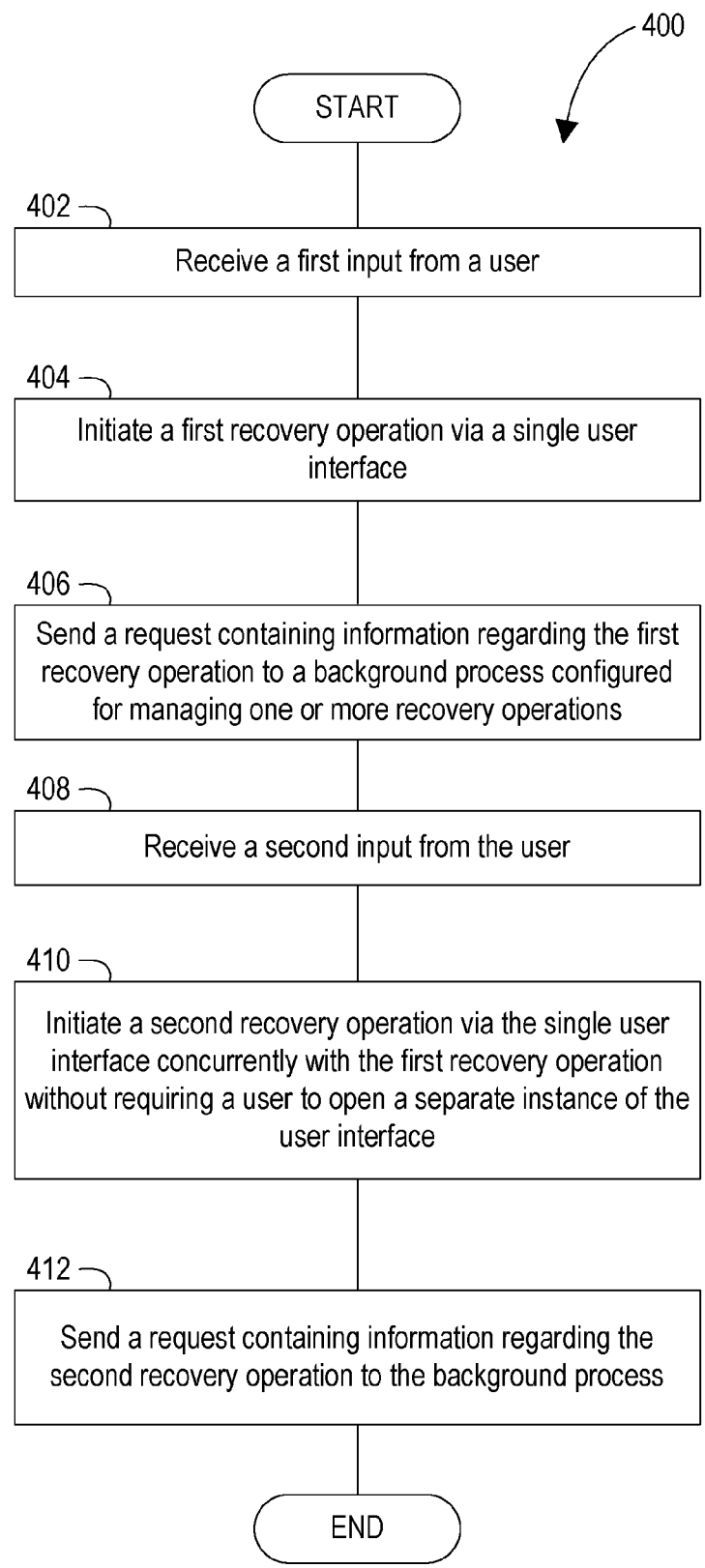
FIG. 4 illustrates an exemplary flow chart for performing multiple concurrent recovery operations.

Referring now to FIG. 4, a method 400 of performing recovery operations is illustrated. The method 400 may be practiced, for example, in a computing system. The method 400 includes, at 402, receiving a first input from a user via a single user interface for identifying the first data object to be recovered during a first recovery operation. In one embodiment, receiving a first input from the user includes identifying additional configuration information, such as the backup storage location from which the first data object will be read, and the recovery storage location to which the first data object will be copied during the first recovery operation.

At 404, the user may also initiate the first recovery operation via the user interface. In one example, referring back to FIG. 2, the first recovery operation includes copying the first data object from the backup storage location 222 or 224 to the recovery storage location 203, as identified by the user.

Method 400 further includes, at 406, sending a request containing at least a portion of the configuration information for the first recovery operation to a background process configured for managing one or more recovery operations. The background process may include a daemon program, such as a jobs daemon, that is customized for managing the concurrent recovery of multiple data objects. As illustrated in FIG. 2, the background process 214 may reside in a recovery server 202.

The method 400 further includes, at 408, receiving a second input from the user via the same user interface employed by the user to initiate the first recovery operation, without requiring the user to open a separate instance of the user interface. Similar to receiving the first input from the user, receiving the second input may include collecting configuration information for the second recovery operation, including the identification of the second data object to be recovered, the backup storage location from which the second data object will be read, and the recovery storage location to which the second data object will be copied.

At 410, the user further initiates the second recovery operation via the same user interface employed by the user to initiate the first recovery operation. At least a portion of the second recovery operation occurs concurrently with at least a portion of the first recovery operation. In one example illustrated in FIG. 2, the second recovery operation includes copying a second data object from the backup storage location 222 or 224 to the recovery storage location 203, as identified by the user at 408.

The method 400 further includes, at 412, sending a request containing at least a portion of the configuration information for the first recovery operation to a background process configured for managing one or more recovery operations.

The method 400 need not be limited to two recovery operations. Instead, the method 400 may further include the initiation of additional recovery operations via the same user interface employed by the user to initiate the first and second recovery operations. Additional recovery operations can also occurs concurrently with other recovery operations initiated via the same user interface.

As described above with reference to FIG. 2, the backup storage location from which the first data object is read may be distinct from the backup storage location from which the second data object is read. Alternatively, the first and second data objects may be read from the same backup storage location. Similarly, the first data object may be copied to a different recovery storage location than the recovery storage location to which the second data object is copied. Alternatively, the first and second of data objects may be covered to the same target recovery storage location. Finally, the first and second data recovery operations may include copying the same data object to multiple target recovery storage locations. Alternatively, the data objects copied during the first and second data recovery operations may be distinct from one another. Advantageously multiple recovery operations implementing any of these embodiments can be initiated through a single user interface and can operate concurrently, eliminating the need for a user to open multiple user interfaces to initiate recovery and/or to wait until a previous recovery operation is complete before configuring the next recovery operation.

Embodiments herein may comprise a special purpose or general-purpose computer including various computer hardware. Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer system, a method for performing recovery operations, the method comprising:
   presenting a single user interface that displays a list of data objects that can be recovered;
   initiating a first recovery operation via the single user interface, the first recovery operation comprising selecting a first data object from the list of data objects and copying the first data object from a first backup storage location to a first recovery storage location that corresponds to a first computing device, wherein the single user interface communicates the selection of the first data object to a background process that interacts with a recovery application to recover the first data object; and
   initiating a second recovery operation via the single user interface without requiring a user to open a separate instance of the single user interface, the second recovery operation comprising selecting a second data object from the list of data objects and copying the second data object selected from the list of data objects from a second backup storage location to a second recovery storage location, at least a portion of the second recovery operation occurring concurrently with at least a portion of the first recovery operation, wherein the second recovery storage location corresponds to a second computing device, wherein the single user interface communicates the selection of the second data object to the background process that interacts with the recovery application to recover the second data object concurrently with the first data object.

2. The method as recited in claim 1,
   wherein initializing the first recovery operation further comprises:
   receiving a first input from a user via the single user interface for identifying the first data object, the first backup storage location from which the first data object is read and the first recovery storage location to which the first data object is copied, and for initializing the first recovery operation; and
   wherein initializing the second recovery operation further comprises:
   receiving a second input from the user via the single user interface for identifying the second data object, the second backup storage location from which the second data object is read and the second recovery storage location to which the second data object is copied, and for initializing the second recovery operation.

3. The method as recited in claim 2, wherein the first backup storage location from which the first data object is read is distinct from the second backup storage location from which the second data object is read.

4. The method as recited in claim 2, wherein the first recovery storage location to which the first data object is copied is distinct from the second recovery storage location to which the second data object is copied.

5. The method as recited in claim 1, wherein the first data object and the second data object are the same data object.

6. The method as recited in claim 1, further comprising initiating a third recovery operation via the single user interface without requiring a user to open a separate instance of the user interface, the third recovery operation comprising copying a third data object from a third backup storage location to a third recovery storage location, at least a portion of the third recovery operation occurring concurrently with at least a portion of at least one of the first or second recovery operations.

7. The method as recited in claim 1,
wherein initializing the first recovery operation further comprises:
acquiring configuration information for the first recovery operation; and
sending a request containing at least a portion of the configuration information for the first recovery operation to the background process configured for managing one or more recovery operations; and
wherein initializing the second recovery operation further comprises:
acquiring configuration information for the second recovery operation; and
sending a request containing at least a portion of the configuration information for the second recovery operation to the background process.

8. The method as recited in claim 7, wherein the background process is a daemon program.

9. In a distributed computer system including at least one backup storage location, at least one server system and at least one recovery storage location, a computer program product configured to implement a method of performing recovery operations, the computer program product comprising one or more computer readable storage media having stored thereon computer executable instructions that, when executed by a processor, causes the server system to perform the following:
present a single user interface that displays a list of data objects for recovery;
initiate a first recovery operation via the single user interface, the first recovery operation comprising selecting a first data object from the list of data objects and copying a first data object from a first backup storage location to a first recovery storage location that corresponds to a first computing device, wherein the single user interface communicates the selection of the first data object to a background process that interacts with a recovery application to recover the first data object; and
initiate a second recovery operation via the single user interface without requiring a user to open a separate user interface, the second recovery operation comprising selecting a second data object from the list of data objects and copying the second data object from the first backup storage location to a second recovery storage location, at least a portion of the second recovery operation occurring concurrently with at least a portion of the first recovery operation, wherein the second recovery storage location corresponds to a second computing device, wherein the single user interface communicates the selection of the second data object to the background process that interacts with the recovery application to recover the second data object concurrently with the first data object.

10. The computer program product as recited in claim 9,
wherein the computer executable instructions that cause the server system to initiate the first recovery operation further comprise instructions to cause the server system to receive a first input from a user via the single user interface for identifying the first data object, the first backup storage location from which the first data object is read and the first recovery storage location to which the first data object is copied, and for initializing the first recovery operation; and
wherein the computer executable instructions that cause the server system to initiate the second recovery operation further comprise instructions to cause the server system to receive a second input from the user via the single user interface for identifying the second data object, the second backup storage location from which the second data object is read and the second recovery storage location to which the second data object is copied, and for initializing the second recovery operation.

11. The computer program product as recited in claim 9, wherein the first data object and the second data object are the same data object.

12. The computer program product as recited in claim 9,
wherein the computer executable instructions that cause the server system to initiate the first recovery operation further comprise instructions to cause the server system to perform the following:
acquire configuration information for the first recovery operation; and
send a request containing at least a portion of the configuration information for the first recovery operation to the background process configured for managing one or more recovery operations; and
wherein the computer executable instructions that cause the server system to initiate the second recovery operation further comprise instructions to cause the server system to perform the following:
acquire configuration information for the second recovery operation; and
send a request containing at least a portion of the configuration information for the second recovery operation to the background process.

13. The computer program product as recited in claim 12, wherein the process is a daemon program.

14. A system for performing recovery operations comprising:
a storage device configured to maintain a backup copy of one or more data objects;
a recovery server comprising:
a recovery application configured to recover data objects from the storage device to multiple computing devices; and
a background process configured to manage multiple concurrent recovery operations; and
a management interface comprising:
a graphical user interface configured to allow a user to initiate the multiple concurrent recovery operations to the multiple computing devices without being required to open separate instances of the graphical user interface for each recovery operation for each computing device, wherein the graphical user interface presents a list of data objects for recovery; and
an interface module configured to communicate with the background process and configured to provide information to the graphical user interface regarding which data objects included in the list of data objects are concurrently selected for recovery and a concurrent status of the recovery operations for each of the selected data objects.

15. The system as recited in claim 14, wherein the background process is a daemon program.

16. The system as recited in claim 14, further comprising at least one recovery storage location in communication with the recovery server for storing copies of the recovered data objects.

17. The system as recited in claim 16, wherein the system is configured such that the multiple concurrent recovery operations are saved to two or more distinct recovery storage locations.

18. The system as recited in claim 16, wherein the at least one recovery storage location is a client computer.

19. The system recited in claim 14, wherein the system is configured such that the multiple concurrent recovery operations are recovering two or more distinct data objects.

20. The method of claim 1, wherein at least one of the first computing device and the second computing device comprises a recovery storage database.

* * * * *